(12) United States Patent
Grass et al.

(10) Patent No.: US 8,828,166 B2
(45) Date of Patent: Sep. 9, 2014

(54) METHOD FOR ULTRASOUND WELDING OF TWO BAG FOILS WITH A SPOUT

(75) Inventors: Werner Grass, Urbach (DE); Guenther Kachel, Goeppingen (DE); Benjamin Goettert, Schlierbach (DE)

(73) Assignee: Wildmann Maschinen E.K., Schlierbach (DE)

( * ) Notice: Subject to any disclaimer, the term of this patent is extended or adjusted under 35 U.S.C. 154(b) by 523 days.

(21) Appl. No.: 13/160,101

(22) Filed: Jun. 14, 2011

(65) Prior Publication Data
US 2011/0303345 A1 Dec. 15, 2011

(51) Int. Cl.
B32B 37/00 (2006.01)
B29C 65/08 (2006.01)
B29C 65/00 (2006.01)
B06B 3/00 (2006.01)

(52) U.S. Cl.
CPC ......... B29C 65/088 (2013.01); B29C 66/53263 (2013.01); B06B 3/00 (2013.01)
USPC .......................................... 156/73.1; 156/69

(58) Field of Classification Search
USPC ............ 156/69, 73.1, 290, 292, 308.2, 308.4, 156/580.1, 580.2; 228/1.1, 110.1
See application file for complete search history.

(56) References Cited

U.S. PATENT DOCUMENTS 6,780,264 B2 * 8/2004 Nakata et al. .................... 156/64
7,661,560 B2 * 2/2010 Murray .......................... 222/107

FOREIGN PATENT DOCUMENTS

EP 1 245 500 A1 10/2002

OTHER PUBLICATIONS

Article: "Alternative zu Dosen, Gläsern und Flaschen", in: Dei—Die Ernährungsindustrie, No. 3, 2007.

* cited by examiner

Primary Examiner — James Sells
(74) Attorney, Agent, or Firm — Henry M. Feiereisen LLC.

(57) ABSTRACT

The invention relates to a method for ultrasound welding of two bag foils to a spout, wherein at a first method step, a lateral edge of a bag foil abutting the spout is welded to the spout with a first oscillating structure, at a second method step, the lateral edge of the second bag foil abutting the opposite side of the spout is welded to the spout with a second oscillating structure, and at a third method step, the lateral edges of the two bag foils located next to the spout are welded to each other with a third oscillating structure.

13 Claims, 5 Drawing Sheets

METHOD FOR ULTRASOUND WELDING OF TWO BAG FOILS WITH A SPOUT

BACKGROUND OF THE INVENTION

The invention relates to a method for ultrasound welding of two bag foils to a spout.

Bags as storage and transport containers for beverages and other liquid and pourable materials are known in the art and have recently found increasing acceptance because they are low-weight and require less space than cans, bottles or other rigid containers when empty. However, it is a desirable to provide these flexible bags with a closure which can be re-closed. For this purpose, a closure (spout) having a foot with, for example, a substantially elliptical, round, diamond-shaped or lens-shaped cross-section is welded between the edges of the bag foils of the bag (pouch). Such spout is typically welded in three consecutive steps requiring several, progressively narrower tools. A problem arises in the region where the two edges of the bag exhibit a sudden increase in height at the location where the closure is received. Welding causes plasticization of the edges and of the closure, requiring application of additional pressure with narrower tools. However, this cannot be precisely carried out, causing capillaries and other leakages these locations. Problems are caused not only by the tolerances of the individual components, but also by the tolerances of the welding machine and the welding tools and the welding motion itself. Because the closure must not only be welded to empty bags, but also to already filled bags, i.e., inline in the filling machine, there is a great need to attain a leak-tight weld.

For example, EP 1 245 500 A1 discloses a bag in which such closure has been welded. The very flat run-out or wing-like ends of the closure can be clearly seen, which help to keep the increase in height of the abutting edges of the bag as small as possible.

The publication "DIE—DIE ERNÄHRUNGSINDUSTRIE 3/2007; Article: Alternatives to Cans, Glass Containers and Bottles" mentions a frequent use of prefabricated bags. These prefabricated bags consist of two plastic or composite foils which are partially welded together, but which are still open on one side to allow filling. After filling, the spout is inserted and the open side of the bag is closed in several welding operations.

It is the object of the invention to provide a method for producing a bag with a spout, by which the bag can be produced by a simpler process.

SUMMARY OF THE INVENTION

The object is solved with a method for ultrasound welding of two bag foils with a spout, wherein at a first method step the lateral edge of a bag foil abutting the spout is welded to the spout with a first oscillating structure, at a second method step the lateral edge of the second bag foil abutting the opposing side of the spout is welded to the spout with a second oscillating structure, and at a third method step the lateral edges of the two bag foils located next to the spout are welded together with a third oscillating structure.

According to the method of the invention, welding is thus performed in several process steps. After the spout is inserted between the two lateral edges of the two bag foils, one lateral edge is welded to one side of the spout. The other lateral edge is subsequently welded to the other side of the spout. Thereafter, the not yet welded rest of the lateral edges can be welded simultaneously or subsequently. Two or three oscillating structures, in particular ultrasound oscillating structures, are used for these two or three process steps. An oscillating structure can hereby also be used as an anvil when the opposing oscillating structure is activated. However, separate anvils may also be used. The individual process steps may be carried out in a single workstation. However, separate workstations may also be provided for each process step.

According to a preferred variant of the method of the invention, at the first and second method step only a partial region of the spout may be welded to the lateral edges of the bag foils. In other words, the end regions of the spout are initially not welded. These end regions are welded together with the outer lateral edges of the bag foils by placing the welding tool slightly onto the spout, thus also engaging these end regions. With this approach, capillaries in these critical end regions are reliably prevented, because sufficient material of the spout is plasticized and pressed into these critical regions when these end regions are welded.

According to another variant of the method of the invention, at the first and second method step the spout is welded to the lateral edges and partial regions of the lateral edges of the bag foils extending beyond the spout are also welded to one another. The welded region then includes the entire spout and a partial region of the abutting lateral edges of the bag foils. The spout is thus completely welded in while ensuring that the weld extends to the section outside the spout. In this variant, too, material is pressed out of the edge region of the spout, thus preventing or inhibiting the formation of capillaries.

If the second and the third method step are combined, then this method step may be performed with a combined second and third oscillating structure. In other words, an oscillating structure is required for one side of the spout and a second oscillating structure is required for the other side of the spout and for the remaining lateral edges.

Additional advantages, features and details of the invention are recited in the dependent claims and described in the following description, where preferred variants of the invention are described in detail with reference to the drawing. The features illustrated in the drawing and described in the description and the claims may be important for the invention, either severally or in any combination.

DETAILED DESCRIPTION OF PREFERRED EMBODIMENTS

Figures 1A, 1B, 1C:
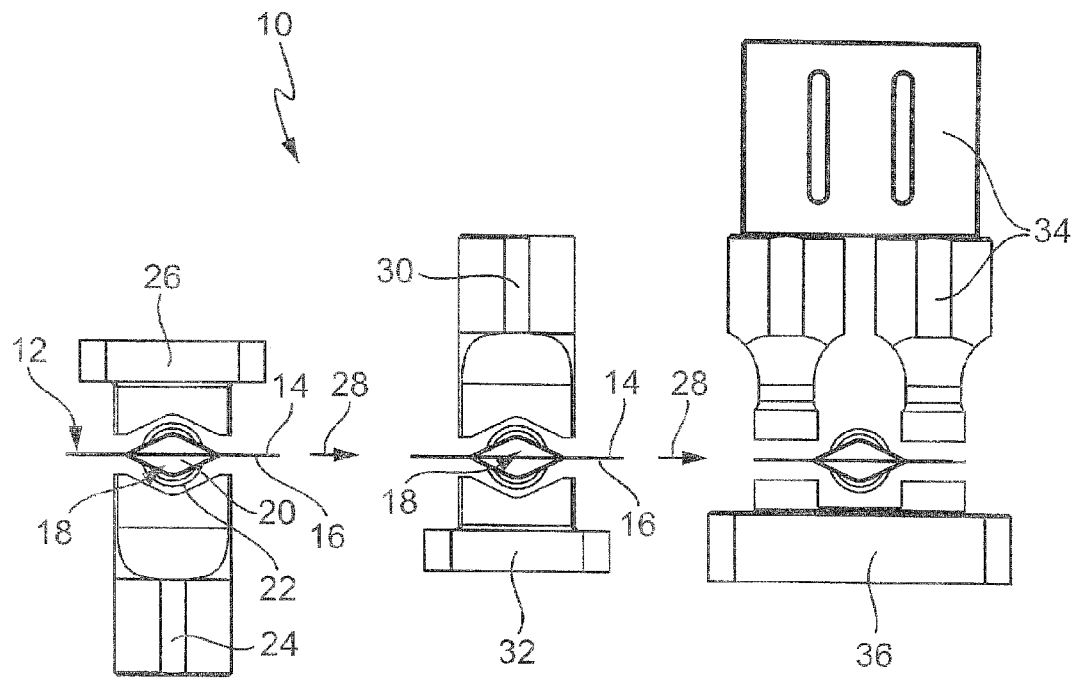
FIGS. 1a-1c a side view of a first embodiment of the invention.

FIG. 1 shows a side view of an ultrasound welding apparatus having the overall reference symbol 10 which is it used to weld a bag or pouch 12 constructed of two bag foils 14 and 16 (see FIG. 2) to a spout 18. The spout 18 is disposed between the two bag foils 14 and 16; also depicted are an approximately diamond-shaped foot 20 and a substantially circular mouthpiece 22, which faces away from the foot 20 in the direction of view. The ultrasound welding apparatus includes a first oscillating structure 24 which is associated with a side face of the foot 20 of the spout 18 and which is used to weld the lateral edge of the bag foil 16 to the spout 18. An anvil 26 arranged on the opposite side is provided for supporting the spout 18. After the tool is closed and ultrasound energy is introduced, the lateral edge of the bag foil 16 is welded to the spout 18. This process takes place at the first method step (FIG. 1a). At the second method step (FIG. 1b), the semi-finished bag or pouch 12 is processed on the other side after being moved in the transport direction 28. For this purpose, a second oscillating structure 30 and a second anvil 32 are provided which are arranged on opposite sides compared to the first method step (FIG. 1a). After the tool is closed and ultrasound energy is introduced, the lateral edge of the bag foil 14 is now also welded to the spout 18. For the third method step (FIG. 1c), a third oscillating structure 34 and a third anvil 36 are provided, between which the semi-finished bag or pouch 12 is moved in the transport direction 28. After the tool is closed and ultrasound energy is introduced, the remaining sections of the two lateral edges of the bag foil 14 are now also welded to each another.

Figure 2:
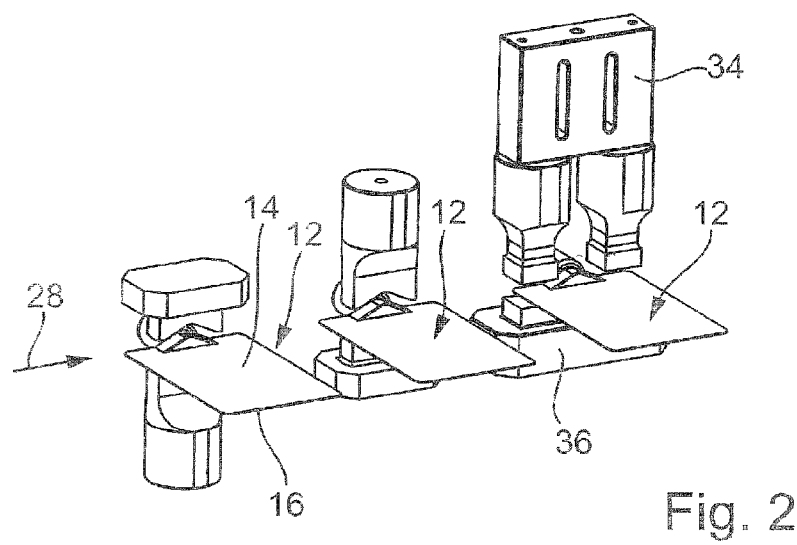
FIG. 2 a perspective view of the variant according to FIG. 1.

FIG. 2 shows the ultrasound welding apparatus 10, which was shown in FIG. 1 in a side view, in a perspective view. As can be clearly seen, the ultrasound welding apparatus 10 may be operated sequentially, wherein the pouch 12 is transported onward by one station between each process step. The first and the second processing stations are constructed with rotational symmetry. The third processing station has mirror-symmetry. However, it is only driven by a single resonator.

Figures 3A, 3B:
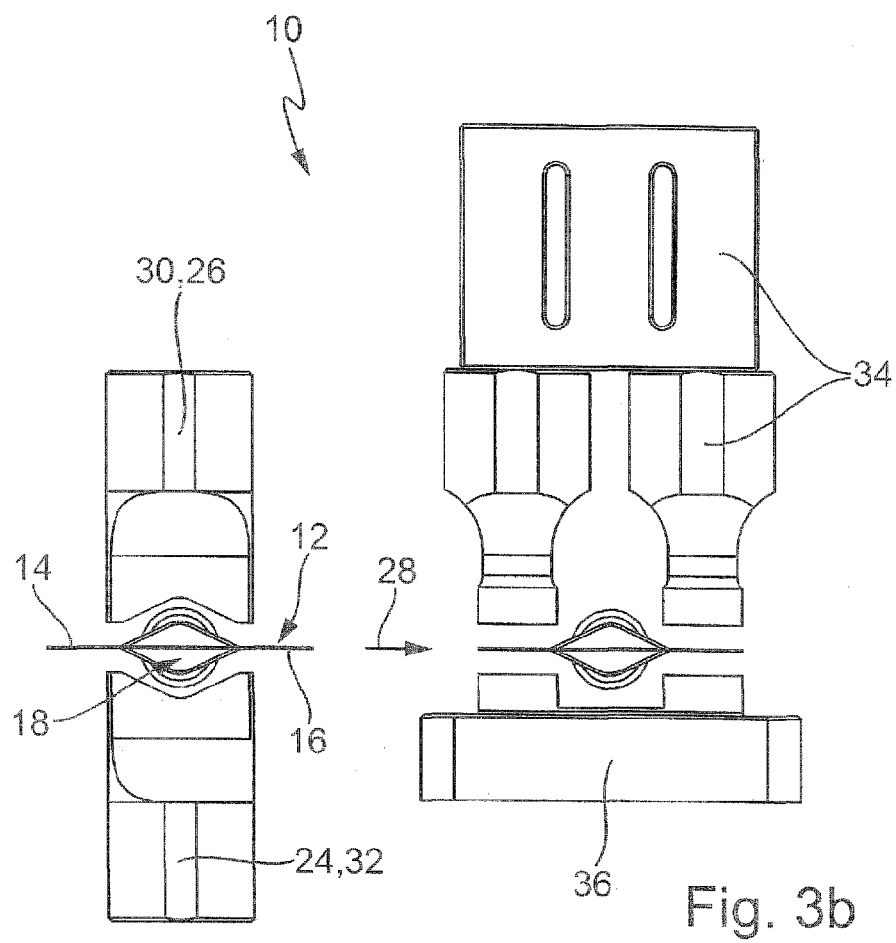
FIGS. 3a and 3b a side view of a second embodiment of the invention.
Figure 4:
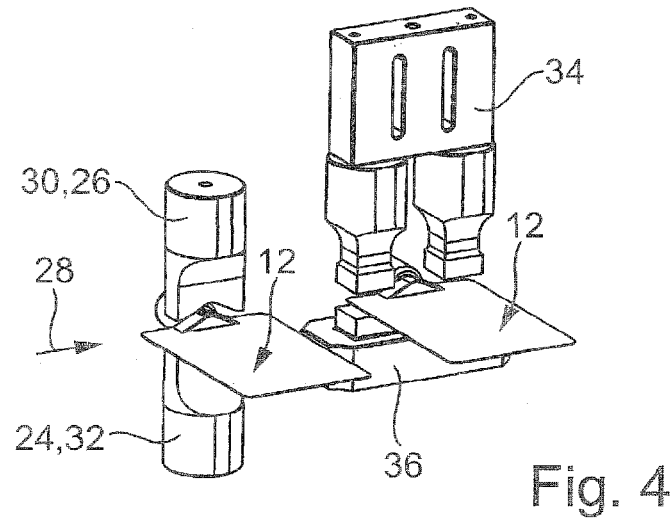
FIG. 4 a perspective view of the variant according to FIG. 3.

FIGS. 3 and 4 show a second variant of the ultrasound welding apparatus 10 according to the invention. In this exemplary embodiment, the first oscillating structure 24 simultaneously forms the second anvil 32, and the second oscillating structure 30 simultaneously forms the first anvil. The third processing station is constructed in the same manner as in the first exemplary embodiment of FIGS. 1 and 2. The pouch 12 is inserted into the first processing station and, at a first process step, the side of the spout 18 facing the oscillating structure 24 is welded to the bag foil 16, whereby the first oscillating structure 24 is activated whereas the second oscillating structures 30 remains deactivated, thus operating as anvil 26. At the second process step, the side of the spout 18 facing the oscillating structure 30 is welded to the bag foil 14, whereby the first oscillating structure 30 is activated and the second oscillating structure 24 remains deactivated, thus operating as anvil 32. The remaining regions of the lateral edges of the two bag foils 14 and 16 are processed at the third process step with the third processing station, as already described with reference to the first exemplary embodiment.

FIG. 4, which shows a perspective view of the ultrasound welding apparatus 10 according to FIG. 3, illustrates that the entire device is built shorter than the variant of FIGS. 1 and 2.

Figures 5A, 5B:
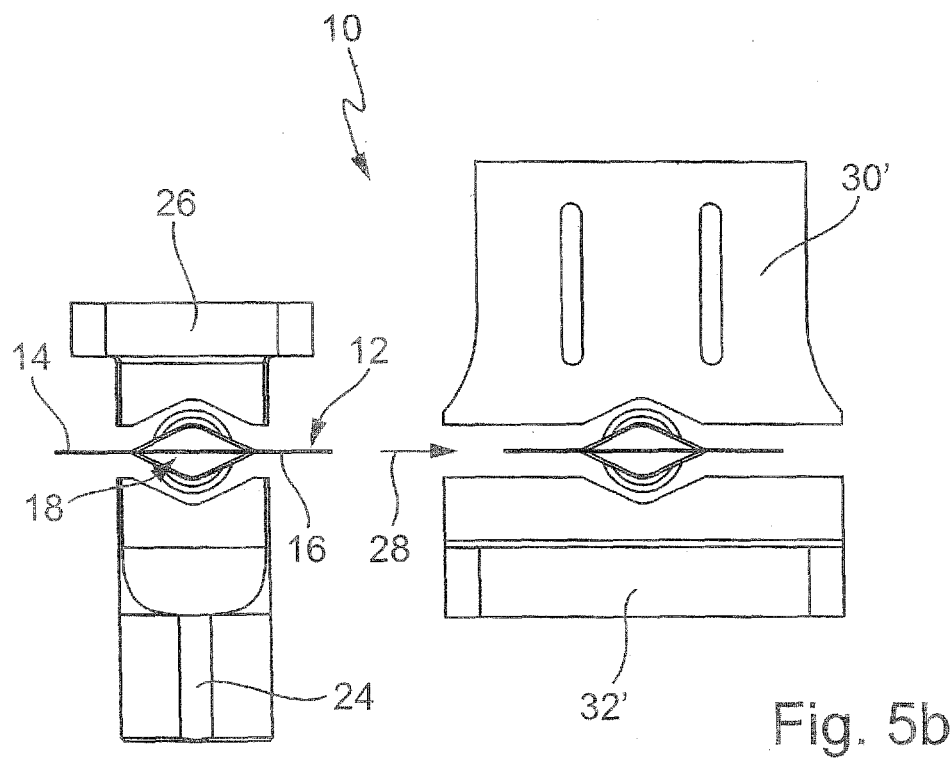
FIGS. 5a and 5b a side view of a third embodiment of the invention.
Figure 6:
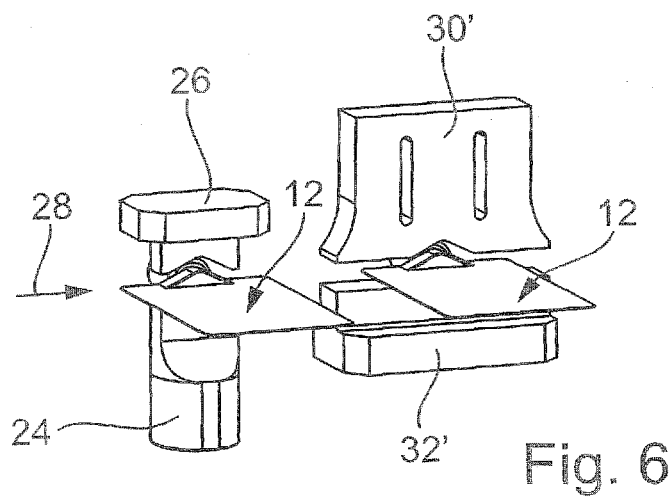
FIG. 6 a perspective view of the variant according to FIG. 5.

FIGS. 5 and 6 show a third variant of the ultrasound welding apparatus 10 according to the invention. In this exemplary embodiment, the first processing station corresponds to that of the first exemplary embodiment according to FIG. 1 and includes a first oscillating structure 24 and an anvil 26. In this first processing station, the lateral edge of the bag foil 16 facing the oscillating structure 24 is welded to the spout 18. The pouch 12 is then moved in the transport direction 28 into the second processing station, which has a second oscillating structure 30' and a second anvil 32'. After the tool is closed, not only the lateral edge of the bag foil 14 facing the oscillating structure 30' is welded to the spout 18 using the second oscillating structure 30', but also the remaining regions of the abutting lateral edges 14 and 16 are welded together. For this purpose, the oscillating structure 30' and the anvil 32' extend over the entire length of the pouch 12. The second and the third process step are thus performed simultaneously in this second processing station. As seen from FIG. 6, which is a perspective view of the ultrasound welding apparatus 10 according to FIG. 5, the entire device is also built as short as the variant of FIGS. 3 and 4.

Figure 7A:
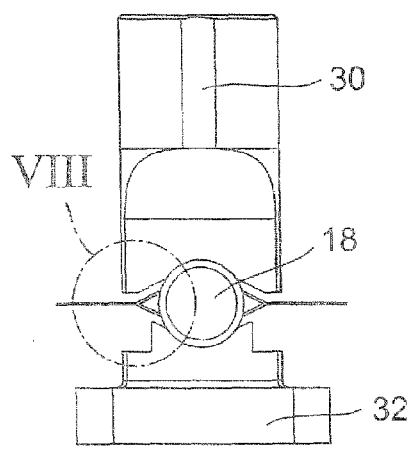
FIGS. 7a and 7b a side view of a fourth embodiment of the invention.
Figure 7B:
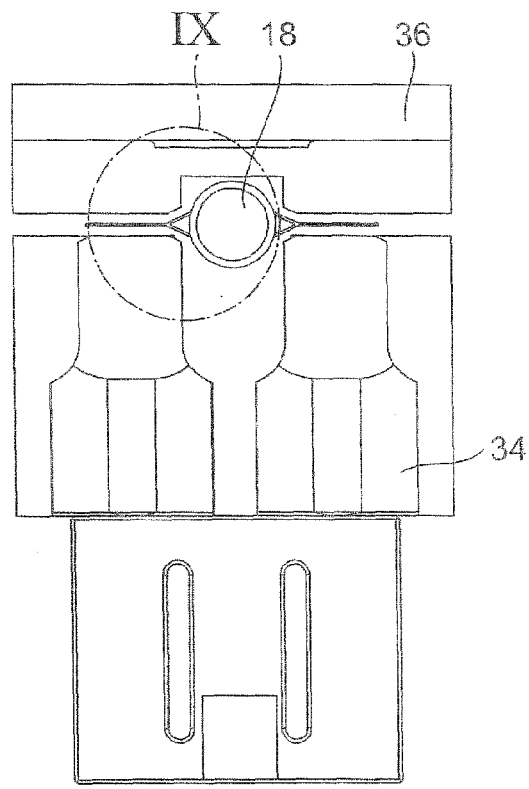
Figure 8:
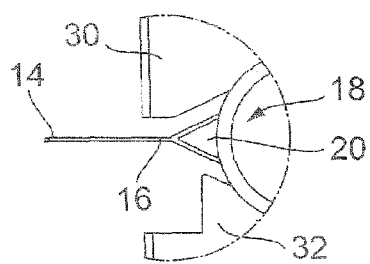
FIG. 8 an enlarged representation of the detail VIII according to FIG. 7.
Figure 9:
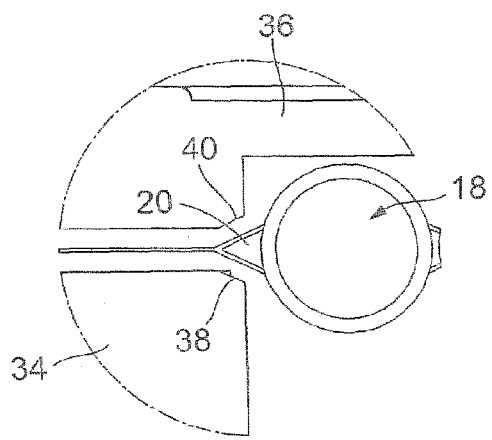
FIG. 9 an enlarged representation of the detail IX according to FIG. 7.

FIG. 7 shows another variant of the ultrasound welding apparatus 10 according to the invention, wherein FIG. 7a) shows in form of an example the second processing station according to FIG. 1. The oscillating structure 30 is unchanged, whereas the anvil 32 has a width which is shorter than the width of the spout 18, as can be clearly seen from the enlarged detail VIII in FIG. 8. As a result, the foot 20 is not completely welded with the lateral edges of the bag foils 14 and 16 during the welding process, so that the outermost end is not welded. The welded region can represent 80% to 95% of the width of the spout 18. FIG. 7b) shows the third processing station according to FIG. 1, wherein the third oscillating structure 34 and the third anvil 36 are constructed so as to slightly overlap with the spout 18. As can also be seen from the enlarged detail IX in FIG. 9, the edges 38 and 40 facing the spout are beveled, with the slope of the bevel extending parallel to the surface of the spout 18. The bevel hereby corresponds to the shape of the abutting region of the spout 18. When the third processing station is closed, the section of the spout 18 that has not yet been welded to the bag foils 14 and 16 is now welded to the bag foils 14 and 16, while plasticizing material of the spout 18 is simultaneously pressed between the bag foils 14 and 16. This prevents the formation of capillaries in this wedge formed of the bag foils 14 and 16 and the spout 18.

Figure 10A:
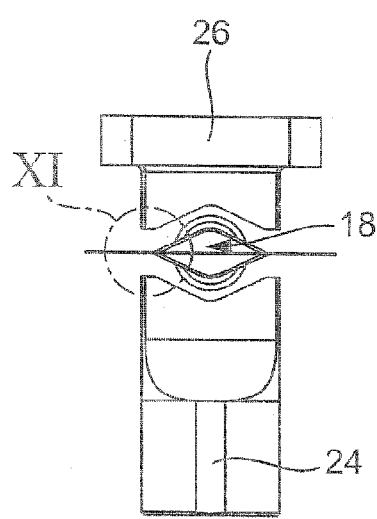
FIGS. 10a and 10b a side view of a fifth embodiment of the invention.
Figure 10B:
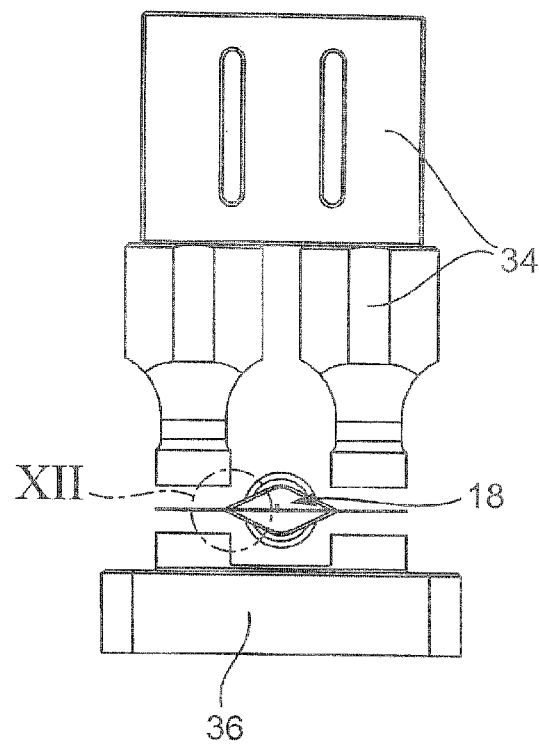
Figure 12:
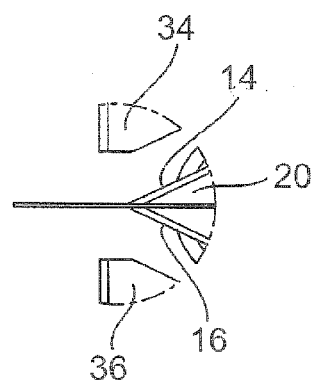
FIG. 12 an enlarged representation of the detail XII according to FIG. 10.
Figure 11:
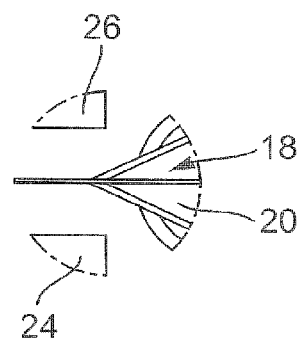
FIG. 11 an enlarged representation of the detail XI according to FIG. 10.

FIG. 10 shows another variant of the ultrasound welding apparatus 10 according to the invention, wherein in FIG. 10a) the first processing station according to FIG. 1 is illustrated in exemplary form. The oscillating structure 24 and the anvil 26 have a width which is greater than the width of the spout 18, as clearly seen from the enlarged detail XI in FIG. 11. This causes the foot 20 to be completely welded to the lateral edges of the bag foils 14 and 16 in the welding operation; in addition, an adjacent region of the lateral edges of the bag foils 14 and 16 is welded to the foot 20. The region welded in this manner may represent 105% to 115% of the width of the spout 18. When this processing station is closed, the spout 18 is securely welded to the bag foils 14 and 16, while plasticizing material of the spout 18 is simultaneously pressed between the bag foils 14 and 16, preventing the formation of capillaries in this wedge formed by the bag foils 14 and 16 and the spout 18. FIG. 10b) shows the third processing station according to FIG. 1, wherein the third oscillating structure 34 and the third anvil 36 are constructed so as just not to overlap with the spout 18. The remaining regions of the abutting lateral edges of the bag foils 14 and 16 are welded together in this third processing station.

The invention claimed is:

1. A method for ultrasound welding of a first and a second bag foil to a spout, comprising the steps of:
    at a first method step, welding a lateral edge of the first bag foil abutting a first side of the spout to the spout with a first oscillating structure,
    after completion of the first method step, at a second method step, welding a lateral edge of the second bag foil abutting a second side of the spout opposite the first side to the spout with a second oscillating structure, and
    at a third method step, welding lateral edges of the first and second bag foils located next to the spout together with a third oscillating structure.

2. The method of claim 1, wherein at the first method step the first oscillating structure is placed in contact with the lateral edge of the second bag foil abutting the spout.

3. The method of claim 1, wherein at the second method step, the second oscillating structure is placed in contact with the lateral edge of the first bag foil abutting the opposite side of the spout.

4. The method of claim 1, wherein the first, second and third oscillating structures are each supported on a corresponding anvil in one-to-one correspondence.

5. The method of claim 1, wherein the first, second and third oscillating structures for welding the spout comprise an ultrasound welding tool.

6. The method of claim 1, wherein at the first and the second method step only a partial region of the spout is welded to the lateral edges of the first and second bag foils.

7. The method of claim 6, wherein at the third method step a remaining region of the spout is welded to the lateral edges of the first and second bag foils, and abutting lateral edges of the first and second bag foils are welded together.

8. The method of claim 1, wherein at the first and second method step, the spout is welded to the lateral edges of the first and second bag foils abutting the spout, and partial regions of the lateral edges of the first and second bag foils extending from the spout are welded to each other.

9. The method of claim 8, wherein at the third method step, remaining regions of the lateral edges of the first and second bag foils are welded to each other.

10. The method of claim 1, wherein the second and the third method steps are performed simultaneously.

11. The method of claim 10, wherein the second and the third method step are performed simultaneously using a combined second and third oscillating structure.

12. The method of claim 1, wherein at the first method step the second oscillating structure operates as an anvil for the first oscillating structure.

13. The method of claim 1, wherein at the second method step the first oscillating structure operates as an anvil for the second oscillating structure.

* * * * *

UNITED STATES PATENT AND TRADEMARK OFFICE
CERTIFICATE OF CORRECTION

Page 1 of 1

PATENT NO. : 8,828,166 B2
APPLICATION NO. : 13/160101
DATED : September 9, 2014
INVENTOR(S) : Werner Grass, Guenther Kachel and Benjamin Goettert It is certified that error appears in the above-identified patent and that said Letters Patent is hereby corrected as shown below:

Title page: Item (30) please add the foreign priority data as follows
--GERMANY 10 2010 028 932.9-27; 05/12/2010--

Signed and Sealed this
Sixteenth Day of December, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,828,166 B2 | Page 1 of 1 |
| APPLICATION NO. | : 13/160101 | |
| DATED | : September 9, 2014 | |
| INVENTOR(S) | : Werner Grass, Guenther Kachel and Benjamin Goettert | |

It is certified that error appears in the above-identified patent and that said Letters Patent is hereby corrected as shown below:

Title page: Please change (73) "Wildmann Maschinen E.K.", into -- Widmann Maschinen E.K. --

Signed and Sealed this
Twenty-third Day of June, 2015

Michelle K. Lee
*Director of the United States Patent and Trademark Office*